(12) United States Patent
Pastryk et al.

(10) Patent No.: US 6,351,958 B1
(45) Date of Patent: Mar. 5, 2002

(54) OPTIC LEVEL SENSING SYSTEM FOR USE IN A REFRIGERATOR

(75) Inventors: Jim J Pastryk, Sawyer; Donald E. Janke, Benton Harbor; Mark H. Nelson, Berrien Springs; Gregory J. Markert, St. Joseph, all of MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 09/482,127

(22) Filed: Jan. 12, 2000

(51) Int. Cl.[7] .................................................. F25C 1/00
(52) U.S. Cl. ..................................... 62/137; 250/227.25
(58) Field of Search ............... 62/137, 340; 250/227.24, 250/227.25; 340/602, 604

(56) References Cited

U.S. PATENT DOCUMENTS

| | | | |
|---|---|---|---|
| 3,545,217 A | 12/1970 | Linstromberg | 62/137 |
| 3,635,043 A | 1/1972 | Sterling | 62/137 |
| 4,649,717 A | 3/1987 | Tate, Jr. et al. | 62/340 |
| 4,756,165 A | 7/1988 | Chestnut et al. | 62/135 |
| 4,920,336 A | 4/1990 | Meijer | 340/169 |
| 4,984,462 A | 1/1991 | Hass, Jr. et al. | 340/619 |
| 5,160,094 A | 11/1992 | Willis et al. | 62/137 |
| 5,376,785 A | * 12/1994 | Chin et al. | 250/214 |
| 6,082,130 A | * 7/2000 | Pastryk et al. | 62/344 |

* cited by examiner

Primary Examiner—William E. Tapolcai
Assistant Examiner—Mohammad M. Ali
(74) Attorney, Agent, or Firm—Stephen Krefman; Robert O. Rice; Thomas J. Roth

(57) ABSTRACT

A system for protecting optical elements from moisture and/or ice build up when used in freezing environment, such as a freezer compartment of a refrigerator. The system includes a hood or sleeve which can be assembled to an optical element such as a light emitting or receiving elements used in a freezer compartment. The sleeve acts to trap air about the optic element such that warm humid air does not readily move into contact with the optic element. Moreover, the warm, humid air that does flow toward the optic element may be cooled by the sleeve such that moisture condenses out of the air and onto the sleeve. A heater may be provided adjacent the sleeve for heating the sleeve if the optic element is impaired due to ice or moisture build up.

17 Claims, 6 Drawing Sheets

OPTIC LEVEL SENSING SYSTEM FOR USE IN A REFRIGERATOR

BACKGROUND OF THE INVENTION

1. Field of the Invention

The invention relates to an optical sensing system for use in a freezing environment and more particularly to a system for protecting optic elements, which form part of an optical sensing system used in a freezing environment—such as in a freezer compartment of a refrigerator, from moisture or ice build-up.

2. Description of Related Art

Many applications require the monitoring of the contents or level of a container. One such application is in automatic ice making systems for use in a home refrigerator. Typically, ice making systems include an ice maker mounted within the freezer compartment of the refrigerator and an ice storage receptacle or bin supported beneath the ice maker for receiving the formed ice from the ice maker. U.S. Pat. No. 4,942,979, to Linstromberg et al. is an example of a prior art ice making system.

In the design of ice maker systems for refrigerators, it is recognized that a control system must be provided for sensing the level of ice disposed in the ice storage bin such that ice pieces are produced when insufficient ice is in the storage bin and ice pieces are not produced when the ice storage bin is filled. A typical ice level sensing system, illustrated by U.S. Pat. No. 5,160,094, to Willis et al., includes an ice maker which employs a bail arm which is periodically lowered into the ice storage bin and then raised back out of the ice storage bin. If the presence of ice pieces interferes with the bail arm being lowered into the ice storage bin, the ice maker is deenergized such that more ice pieces are not produced.

Conventional ice level sensing systems such as the one disclosed by Willis et al. have several drawbacks. Firstly, these mechanical linkage type systems include many moving parts which are subject to failure—particularly in the relatively harsh environment of a freezer. Moving parts may readily become frozen under some circumstances causing the level sensing system to fail. Secondly, conventional ice level sensing systems are not easily applied to a refrigerator ice making system having a door mounted ice storage bin. Door mounted ice storage bins offer several advantages—including making more space available for freezer shelving. However, if a conventional bail arm type ice level sensing system is used with a door mounted ice storage bin, damage may readily occur to the bail arm if the refrigerator door is opened when the bail arm is being lowered into the ice storage bin.

U.S. Pat. No. 3,635,043, to Sterling, is directed to a refrigeration system including a door mounted ice storage receptacle. Sterling discloses having a photoelectric system employing an incandescent lamp 54 and a photocell 55—for sensing the level of ice in the door mounted bin. The lamp 54 is continuously on and shines a light beam across an ice storage bin. When the beam of light is interrupted by accumulated ice, ice harvesting is prevented. Unfortunately, the system disclosed by Sterling consumes a relatively large amount of energy. Moreover, the incandescent lamp, being continuously on, will have a relatively short life—requiring frequent bulb replacement.

U.S. Pat. Nos. 4,984,462 and 4,920,336 also disclose photoelectric or optic systems for measuring the contents of a container. U.S. Pat. No. 4,920,336 is directed to a system for monitoring the level of fluid in reservoirs to progressively administer solutions to hospital patients. U.S. Pat. No. 4,984,462 discloses monitoring the liquid level in batteries.

SUMMARY OF THE INVENTION

The present invention is directed to a unique manner in which optical elements can be protected from moisture and/or ice build up when used in freezing environment, such as a freezer compartment of a refrigerator.

More particularly, the present invention is directed to a hood or sleeve which can be assembled to an optical element such as a light emitting or receiving element used in a freezer compartment and which acts to trap air about the optic element such that warm humid air does not readily move into contact with the optic element. Moreover, the warm, humid air that does flow toward the optic element may be cooled by the sleeve such that moisture condenses out of the air and onto the sleeve. In this way, the sleeve acts as a type of getter or desiccant, removing moisture from the air surrounding optic element.

Still more particularly, the present invention is directed to an optical system for sensing the level of contents within a container which is disposed within a freezing environment. The system includes an emitter assembly which comprises a printed circuit board, a light emitting element mounted on the printed circuit board and a heater resistor mounted on the printed circuit board and disposed adjacent the light emitting element. A first sleeve is disposed about the light emitting element and is secured to the first heater resistor. The system also includes a receiver assembly which comprises a second printed circuit board, a light receiving element mounted on the printed circuit board and a second heater resistor mounted on the second printed circuit board disposed adjacent the light receiving clement. A second sleeve is disposed about the light receiving element and is secured to the second heater resistor. The sleeves act to trap air about the optic elements such that warm humid air does not readily move into contact with the optic elements. Moreover, the warm, humid air that does flow toward the optic elements is cooled by the sleeve such that moisture condenses out of the air and onto the sleeve.

DESCRIPTION OF THE PREFERRED EMBODIMENTS

Figure 1:
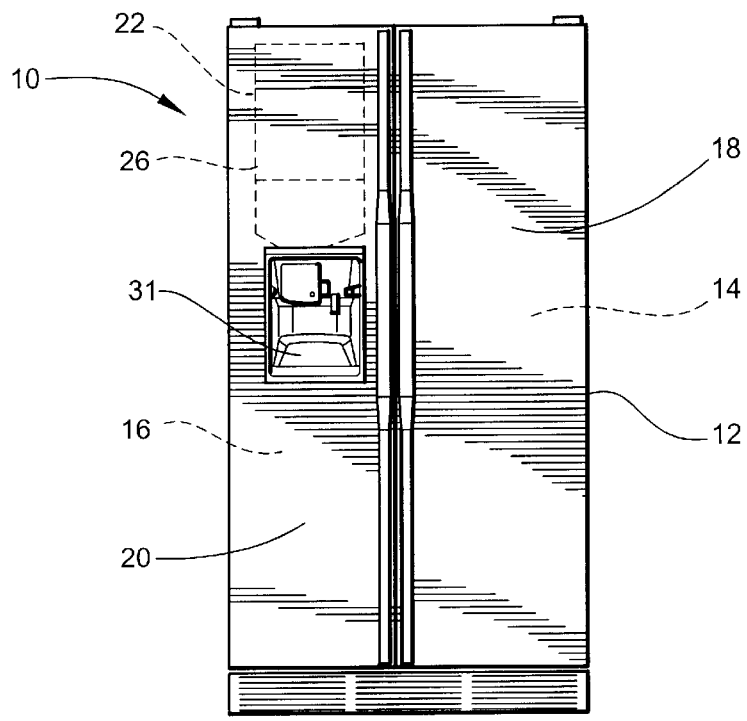
FIG. 1 is a front view of a refrigerator apparatus having an ice storing and dispensing system embodying the present invention.
Figure 2:
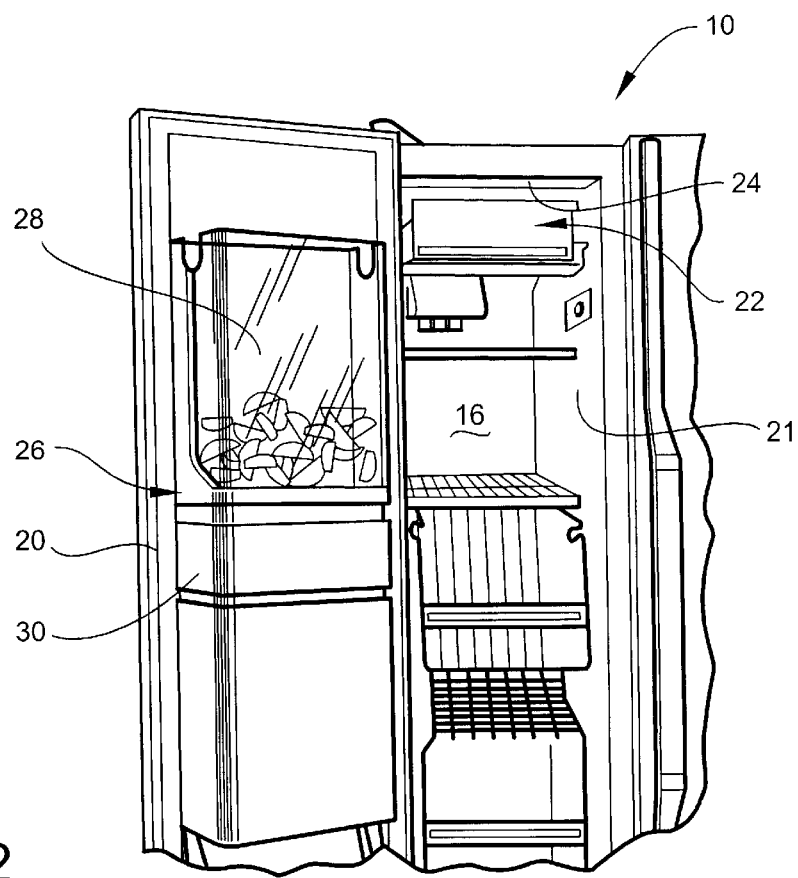
FIG. 2 is a fragmentary perspective view illustrating the ice storing and dispensing system within the freezer compartment of the refrigerator apparatus with the freezer door open.
Figure 3:
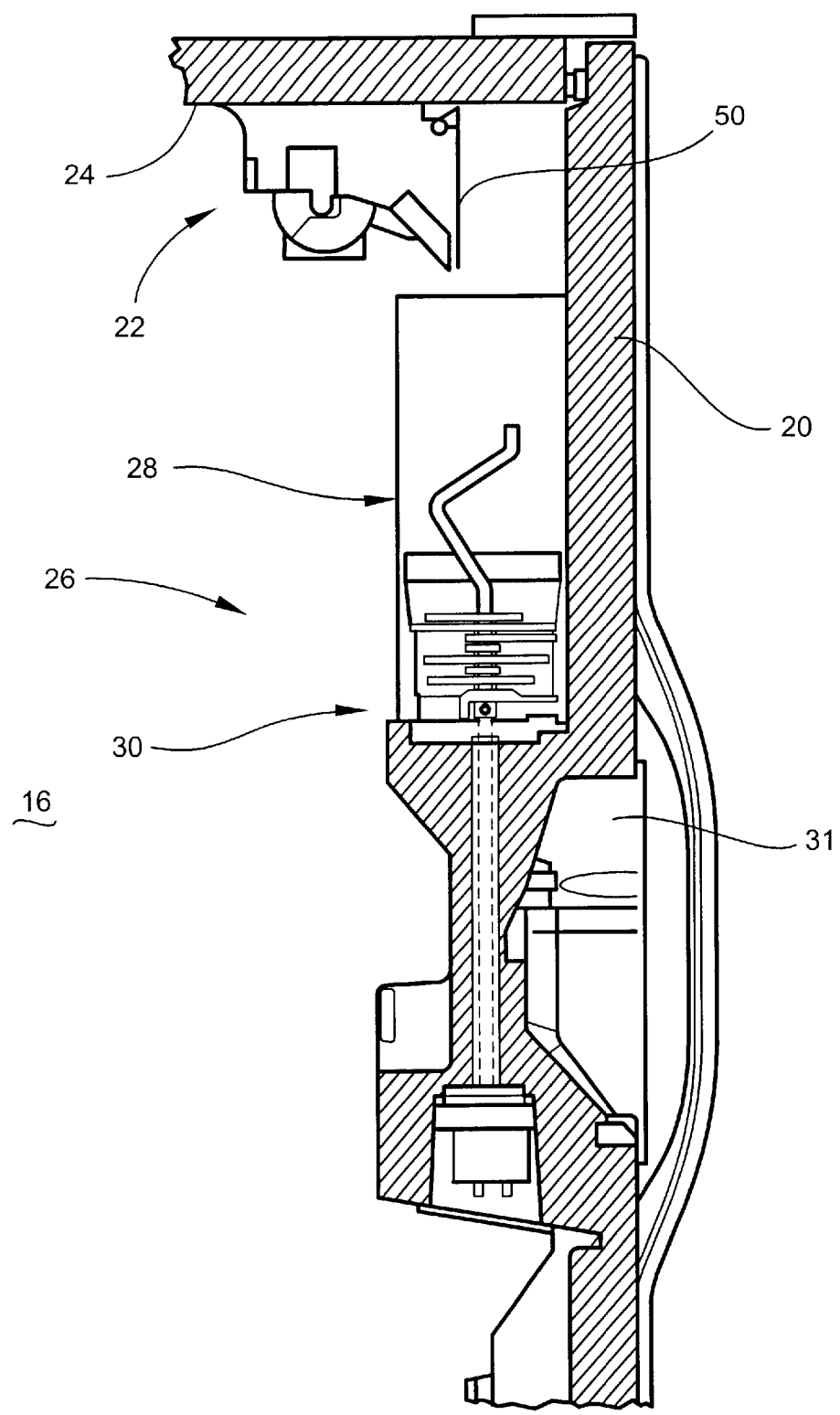
FIG. 3 is a fragmentary, side sectional view of the ice storing and dispensing system of FIG. 1.

In the illustrative embodiment of the invention as shown in FIGS. 1–3, a refrigerator 10, comprising a side-by-side fresh food/freezer configuration, is provided having a cabinet 12 forming an above freezing fresh food compartment 14 and a below freezing freezer compartment 16. Both the fresh food compartment 14 and the freezer compartment 16 are provided with access openings. A fresh food closure member or door 18 and a freezer closure member or door 20 are hingedly mounted to the cabinet 12 for closing the access openings, as is well known.

An ice making assembly 22 is disposed within the freezer compartment 16 having side walls 21 and 23 (see FIG. 4) and a top wall 24. The ice making assembly 22 is mounted to the inside surface of the top wall 24 of the freezer compartment 16. An ice dispensing system 26, mounted to the freezer door 20, is provided below the ice making assembly 22 for receiving ice pieces therefrom. The ice dispensing system 26 includes an ice storage receptacle or bin 28 having an ice crushing system 30. When operated, the ice dispensing system 26 transfers ice pieces from the bin 28 through the freezer door 20 whereby ice pieces may be dispensed through a conventional, forwardly exposed ice dispenser station or external ice service area 31.

Figure 4:
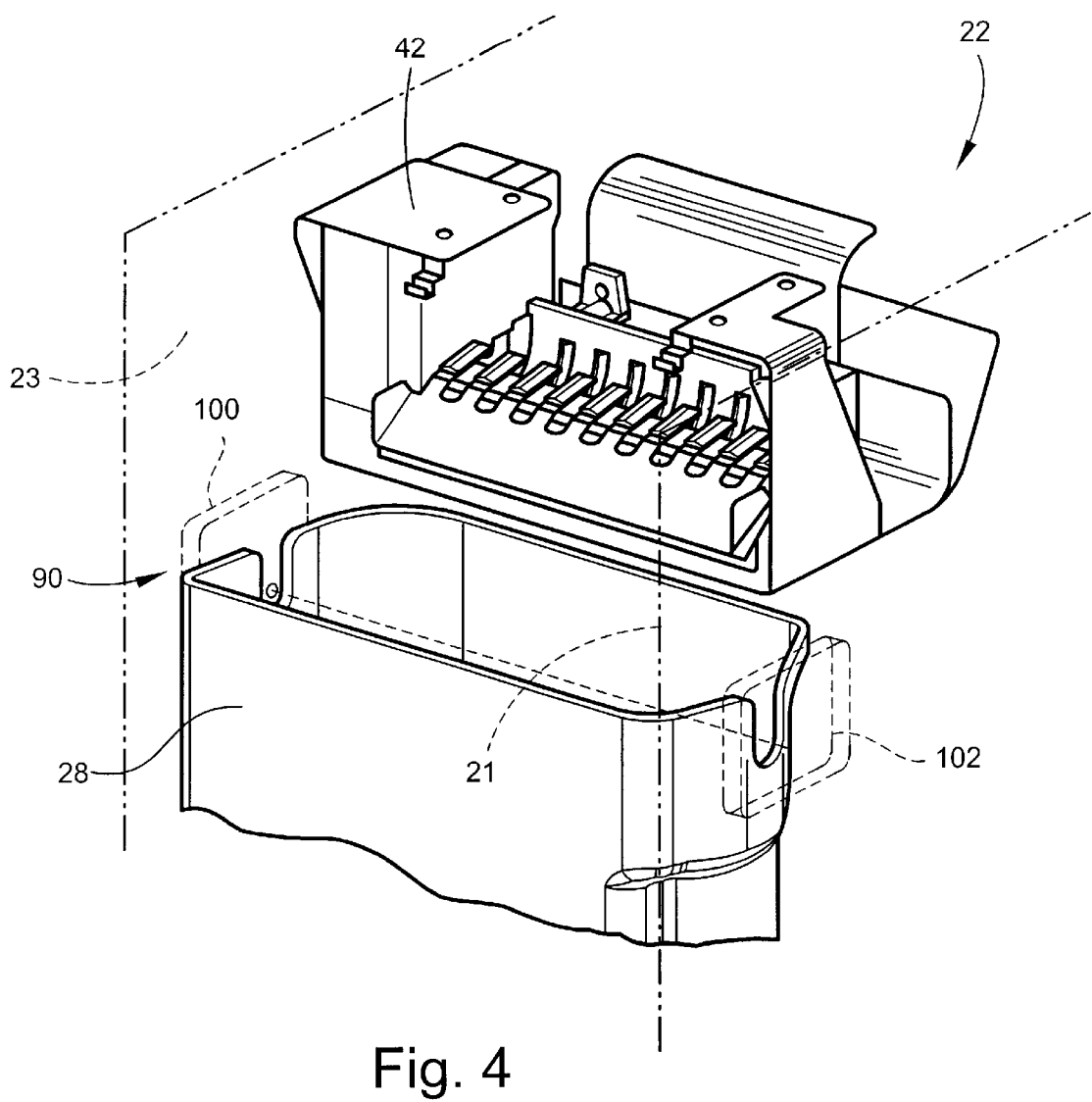
FIG. 4 is a fragmentary, perspective view of the ice storage and dispensing system of the present invention wherein the front cover of the ice maker has been removed.

In FIG. 4, the ice maker 22 is shown to be supported by a mounting bracket 42 along the upper, front portion of the freezer compartment 16. The mounting bracket 42 is attached to the top wall 24 (FIG. 3) of the freezer compartment. Although disclosed herein, the manner in which the ice maker 22 is supported within the freezer compartment does not form part of the present invention and may be readily varied—as can be appreciated by those skilled in the art. For example, the ice maker may be supported on bracket type elements extending from the side walls of the freezer compartment.

The present invention may be beneficially employed with any type of known ice maker. In the preferred embodiment, as shown in FIG. 4, the ice maker assembly 22 is a conventional ice piece making apparatus which forms crescent shaped ice pieces. The ice makers disclosed in U.S. Pat. Nos. 4,649,717 and 5,160,094, are illustrative of the type of ice maker used in the present invention. When ice pieces are ready to be harvested from an ice mold body the ice pieces are removed from the mold body and urged to slide forwardly and fall into the bin 28.

An optic control system 90 is provided to prevent ice harvesting when the ice storage bin 28 is full of ice pieces. The need for this function is well recognized in the ice maker art. If ice harvesting is not appropriately controlled, the ice maker 22 may make an excessive quantity of ice and overfill the ice storage receptacle 28. In an optical ice level sensing system, light (electromagnetic radiation of any wavelength) is used to sense the presence of ice pieces. An optical ice level sensing system takes advantage of the fact that ice pieces formed by a conventional ice maker, as described above, have a cloudy core which is due to air bubble entrapment, crazing during the freezing process, and water impurities among other things. This cloudy core of the ice pieces blocks a wide range of wave lengths that are generated and sensed by many standard infrared (IR) radiation products.

Figure 5:
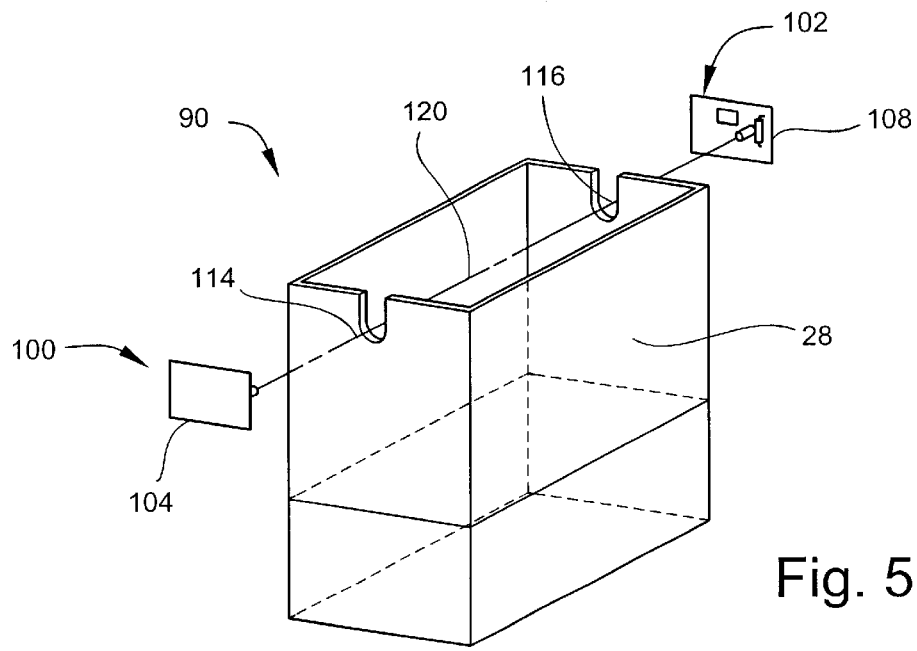
FIG. 5 is a simplified, elevational view of the ice storage bin and the optical control system of the present invention.
Figure 6:
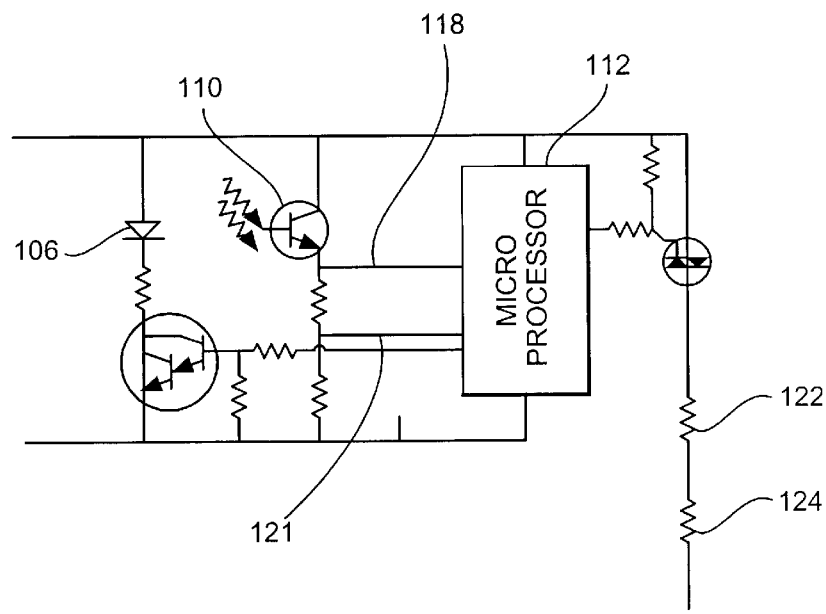
FIG. 6 is a schematic electrical diagram illustrating the circuitry of the optical control system of FIG. 5.

As shown in FIGS. 5 and 6, the optical ice level sensing system includes a light emitter element or assembly 100 and a light receiver element or assembly 102. The emitter assembly 100 includes a printed circuit board (PCB) 104 having a IR photo diode or light emitting diode (LED) 106 which emits an IR light. The receiver assembly 102 includes a printed circuit board 108 having a photo transistor 110. A microprocessor 112 and the necessary electronic circuitry to operate the optical ice level sensing system are provided and may be mounted to one of the PCB's 104 or 108 or may be positioned in some other suitable location. The microprocessor 112 controls the operation of the ice level sensing system.

The emitter assembly 100 may be mounted to a side wall, such as side wall 23, of the freezer compartment 16 adjacent the top of the ice storage bin 28 while the receiver assembly 102 may be mounted to the opposite side wall 21 of the freezer compartment 16 across from the emitter 100. A pair of slots or openings 114 and 116 are disposed in the ice storage bin 28 near the top surface of the bin 28 such that a line of sight or clear path 120 is created between the emitter assembly 100 and the receiver assembly 102.

When the ice maker 22 is ready to harvest ice pieces, IR radiation is generated by the LED 106 which is directed to pass along the path 120 through the ice storage bin 28 to be received by the phototransistor 110. As discussed above, ice pieces, due to there cloudy core, will impede the transmission of the IR radiation such that the level of the IR signal received by the receiver can be used as an indicator of the ice level. When the LED 106 is pulsed, if the photo transistor 110 senses an IR signal, this indicates that the ice bin 28 is not completely filled with ice and the ice maker 22 will be operated to produce and harvest more ice pieces. If the photo transistor 106 does not sense an IR signal when the emitter 100 is pulsed, this indicated that the ice bin 28 is full of ice pieces and further ice will not be harvested.

One problem with an optical ice level sensing system is that ice can coat the photo diode 106 and the photo transistor 110 such that sending and receiving an IR signal is impaired. The signal may be degraded to a point where the optical system provides a false full ice bin signal when in fact the ice storage bin is not full of ice pieces. This occurs particularly quickly when the refrigerator is operated in a hot and humid location wherein when the freezer door 20 is opened, moisture immediately condenses onto the cold surfaces, including the LED 106 and the photo transistor 110, within the freezer compartment 16.

This degradation can be sensed and distinguished from a normal situation as shown in FIG. 6. The microprocessor 112 receives signal 1 across line 118 and signal 2 across line 121. With clean optics, both signal 1 and 2 are read as a logic level "1" when the bin is empty and a logic level "0" when the bin is full. At some point during the degradation process, the lesser voltage at signal 2 will fall below the microprocessor input threshold and be read as a logic level "0" while the greater signal 1, is still large enough to be read as a logic level "1". Whenever signals 1 and 2 differ, ice build up has occurred and it is necessary to clean the optic system.

Heater resistors are shown as 122 and 124 and are used to clean the optics system. The heaters are physically located adjacent the photo transistor 110 and the LED 106. When optic cleaning is necessary, the heaters 122 and 124 may be energized to warm the photo transistor 110 and the LED 106 such that the accumulated ice is melted away.

Figure 7:
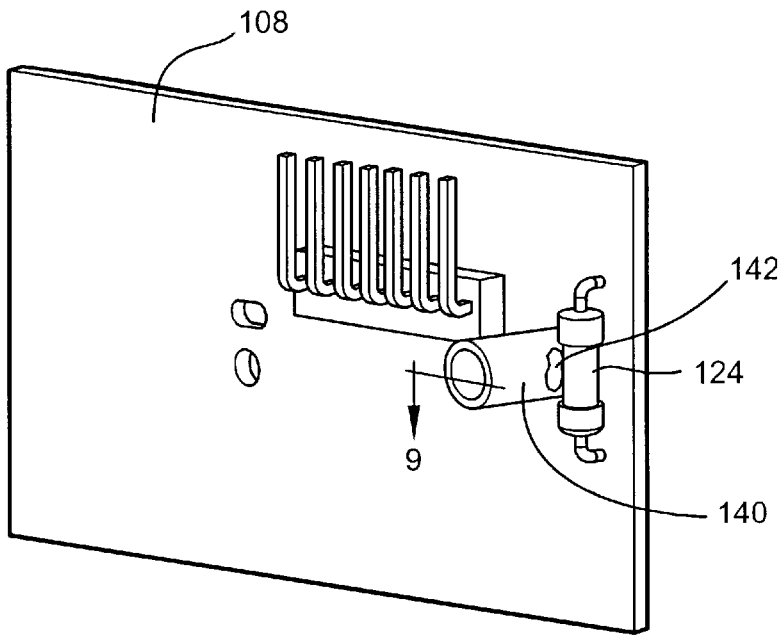
FIG. 7 is an enlarged view of the printed circuit board which supports the phototransistor and which forms the light receiving element of the present invention.
Figure 8:
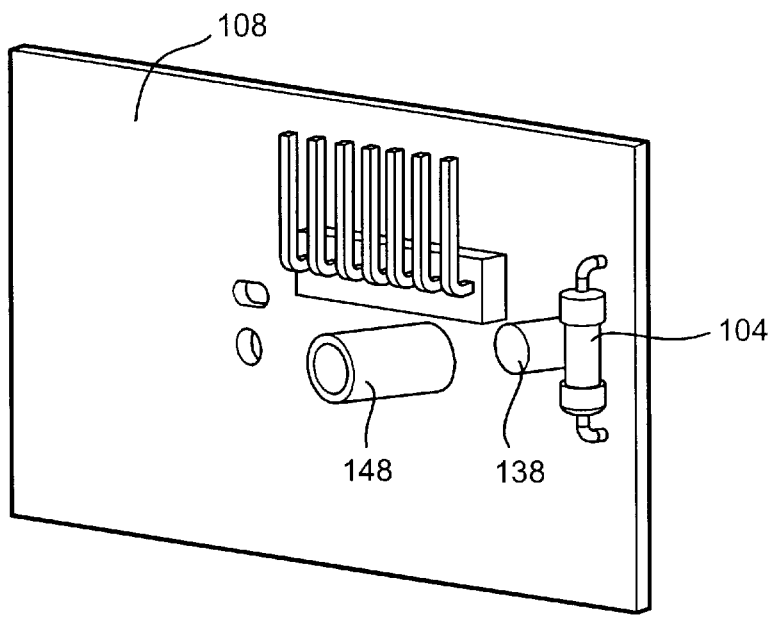
FIG. 8 is an enlarged, partially exploded view of the printed circuit board which supports the phototransistor and which forms the light receiving element of the present invention.
Figure 9:
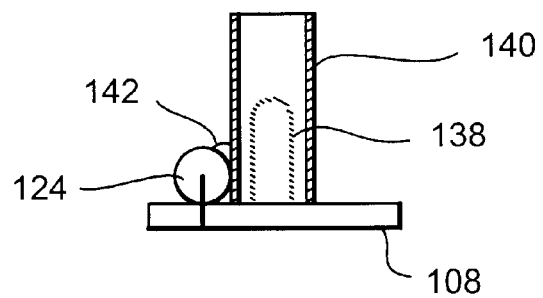
FIG. 9 is a sectional view taken along line IX—IX of FIG. 7.

FIGS. 7–9 illustrate a further way in which the present invention addresses the problem of optic element fogging.

These FIGS. depict the printed circuit board 108 which forms part of the light receiving element 102. The PCB 108 supports the phototransistor 110 (see FIG. 6) which includes a lens portion 138. As can be seen, various electronic components may also be present on the printed circuit board 108.

To minimize moisture condensation on the phototransistor 110, an aluminum cylinder or sleeve 140 is mounted to the printed circuit board to surround the lens portion 138 of the phototransistor 110. The sleeve 140 has a diameter which is greater than the lens 138 and has height which is greater than the height of the lens. In this way, air is trapped about the phototransistor such that when the freezer door is opened, warm humid air does not readily move into contact with the phototransistor 110. Moreover, the warm, humid air that does flow toward the phototransistor is cooled by the sleeve 140 such that moisture condenses out of the air and onto the sleeve 140. In this way, the aluminum cylinder 140 acts as a type of getter or desiccant, removing moisture from the air surrounding phototransistor 110.

To further improve the performance of the optic elements 106 and 110 in the freezer environment, the sleeve 140 can be used in conjunction with a heater. As shown, the resistor 124 may be provided adjacent the sleeve 140 such that when the optic elements are impaired due to moisture or ice build up, the microprocessor 112 causes the resistor 124 to heat up which in turn heats the phototransistor 110.

It can be understood that the sleeve 140 must be held in place and should preferably be thermally coupled to the heater 124. To achieve this end, a small drop of heat conductive adhesive such as epoxy 142 may be provided between the resistor 124 and the sleeve 140. In this way the sleeve 140 will be securely held in place and a heat transfer path between the sleeve 140 and the resistor 124 will be provided. Alternatively, a spring clip may be provided with a flange on one end. The clip could include a barrel portion to function as the sleeve. The clip could further include a flange portion to warp around the resistor 124 to hold the clip in place and to provide a heat transfer path from the resistor to the barrel portion.

Figure 10:
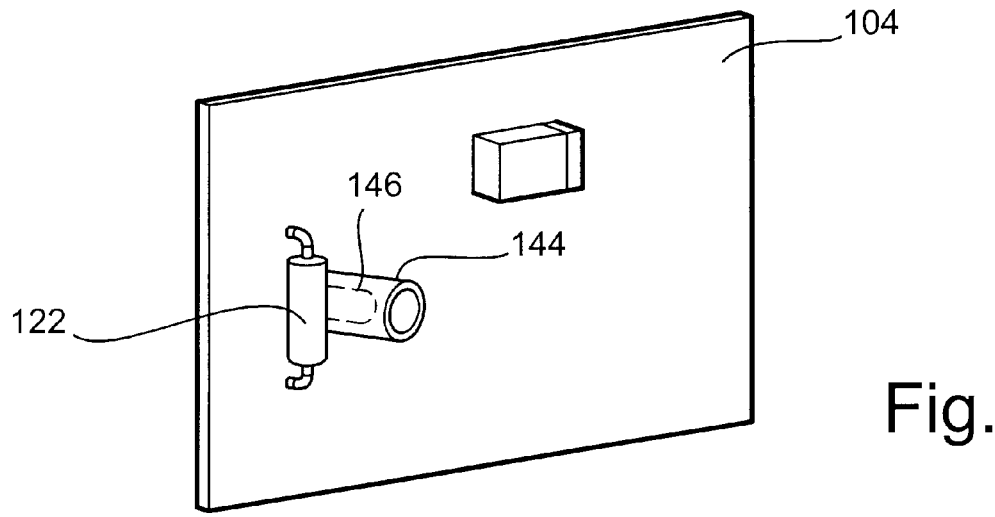
FIG. 10 is an enlarged view of the printed circuit board which supports the light emitting diode and which forms the light emitting element of the present invention.

It can be understood that the use of this novel sleeve system can be beneficially used with both the light emitting element or LED 106 and the light receiving element or phototransistor 110. FIG. 10 illustrates the printed circuit board 104 which forms part of the light emitting assembly 100. A second sleeve 144 is disposed about a lens 146 which forms part of the LED 106 (see FIG. 6). The heater resistor 122 is provided adjacent the sleeve 144.

It can be seen, therefore, that the present invention provides a unique system for protecting optic elements in a freezing environment. More particularly, an optic system is provided for sensing the level of ice in a ice storage bin, wherein the optic elements are provided with a hood or sleeve to avoid optic element degradation due to moisture or ice.

It can be appreciated that the optic sensing system of the present invention—shown in the form of a sensor pair—can be any type of system which includes a source of optical energy and a detector of optical energy. Although an LED and a phototransistor are shown, there may be other types of optical elements which could be suitable for use with the present invention.

It can also be appreciated that while the present disclosure is directed to a door mounted ice storage bin, the invention may be practiced on any number of ice storage configurations—both bins mounted to freezer doors and the more conventional mounting to the freezer cabinetry.

Accordingly, while the present invention has been described with reference to the above described embodiments, those of skill in the art will recognize that changes may be made thereto without departing from the scope of the invention as set forth in the appended claims. The applicant does not intend to limit his invention to the specific embodiments disclosed above, but rather seeks protection for his invention as described in the appended claims.

We claim:

1. An optical system for sensing the level of contents within a container which is disposed within a freezing environment, the system comprising:

a light emitting element for generating a light signal, the light emitting element including a light emitting lens for directing the light signal across an upper portion of the container;

a light receiving clement for receiving the light signal emitted by the light emitting element, the light receiving element having a light receiving lens;

a first sleeve disposed about the light emitting lens; and a second sleeve disposed about the light receiving lens, wherein the sleeves act to prevent moisture from condensing onto the light emitting and receiving elements.

2. The optical system according to claim 1, wherein the light emitting element is a light emitting diode and the light receiving element is a phototransistor.

3. The optical system according to claim 1, further comprising:

a first heater resistor disposed adjacent the first sleeve; and a second heater resistor disposed adjacent the second sleeve, wherein the first and second heater resistors operate to heat the first and second sleeves and the light emitting element and the light receiving element.

4. The optical system according to claim 1, wherein the first sleeve comprises an aluminum tube having a diameter greater than the diameter of the light emitting lens and further having length greater than the height of the light emitting lens, and the second sleeve comprises an aluminum tube having a diameter greater than the diameter of the light receiving lens and further having length greater than the height of the light receiving lens.

5. A refrigerator comprising:

a freezer compartment;

an ice making system located in the freezer compartment of a refrigerator, the ice making system including an ice maker and an ice storage bin for receiving ice pieces formed by the ice maker, a light emitting element for generating the beam of light across the upper portion of the ice storage bin;

a light receiving element for receiving the beam of light; and a first sleeve disposed about the light emitting element;

wherein the first sleeve acts to prevent moisture from condensing onto the light emitting element.

6. The refrigerator according to claim 5, further comprising:

a second sleeve disposed about the light receiving element, wherein the second sleeve acts to prevent moisture from condensing onto the light receiving element.

7. The refrigerator according to claim 6, wherein the light emitting element is a light emitting diode and the light receiving element is a phototransistor.

8. The refrigerator according to claim 5, further comprising:
- a first heater resistor disposed adjacent the first sleeve;
- wherein the first heater resistor operates to heat the first sleeve and the light emitting element.

9. The refrigerator according to claim 5, wherein:
- the light emitting element including a light emitting lens for directing the light signal across an upper portion of the ice storage bin;
- the light receiving element including a light receiving lens,
- wherein the first sleeve is disposed about the light emitting lens.

10. The refrigerator according to claim 8, further comprising:
- a bead of heat conductive material disposed between the first heater resistor and the first sleeve for securing the sleeve in place and for promoting heat transference between the first sleeve and the first heater resistor.

11. An optical system for sensing the level of contents within a container which is disposed within a freezing environment, the system comprising:
- an emitter assembly including
  - a printed circuit board,
  - a light emitting element mounted on the printed circuit board,
  - a heater resistor mounted on the printed circuit board and disposed adjacent the light emitting element, and
  - a sleeve disposed about the light emitting element, the sleeve being secured to the heater resistor; and
- a receiving element.

12. The optical system according to claim 11, further comprising:
- a receiver assembly including
  - a second printed circuit board
  - the light receiving element mounted on the second printed circuit board,
  - a second heater resistor mounted on the second printed circuit board and disposed adjacent the light receiving element, and
  - a second sleeve disposed about the light receiving element, the second sleeve being secured to the second heater resistor.

13. The optical system according to claim 12, further wherein the sleeve and the second sleeve are secured to the heater and the second heater by heat conductive adhesive material.

14. An optical system for sensing the level of contents within a container which is disposed within a freezing environment, the system comprising:
- a optic element; and
- a sleeve disposed about the optic element wherein the sleeve acts to prevent moisture from condensing onto the optic clement.

15. The optical system of claim 14, further comprising:
- a printed circuit board on which the optic element is mounted, the sleeve being connected to the printed circuit board,
- a heater resistor mounted to the printed circuit board adjacent the sleeve,
- wherein the heater resistor and sleeve are connected to promote heat transfer therebetween.

16. The optical system of claim 15, wherein thermally conductive adhesive joins the heater resistor and the sleeve.

17. The optical system of claim 14 wherein:
- the optic element includes a lens portion, and
- the sleeve is disposed about the lens portion and is a cylindrical, metallic member which has diameter greater than the lens portion and further has a height greater than the lens portion.

* * * * *